H. C. FLINT.
SILENCER.
APPLICATION FILED JUNE 22, 1915.

1,176,356.

Patented Mar. 21, 1916.

Witnesses
Fenton S. Belt
J. W. Sherwood

Inventor
H. C. Flint
By Franklin N. Hough
Attorney

UNITED STATES PATENT OFFICE.

HOBART C. FLINT, OF TAMPA, FLORIDA.

SILENCER.

1,176,356. Specification of Letters Patent. Patented Mar. 21, 1916.

Application filed June 22, 1915. Serial No. 35,625.

*To all whom it may concern:*

Be it known that I, HOBART C. FLINT, a citizen of the United States, residing at Tampa, in the county of Hillsborough and State of Florida, have invented certain new and useful Improvements in Silencers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in automobile silencers and consists in the provision of a simple and efficient device of this nature adapted to prevent the rattling of the knuckle joint between the spindle arms and the steering rod.

The invention comprises a simple and efficient device of this nature having various details of construction, combinations and arrangements of parts which will be hereinafter fully described, shown in the accompanying drawings and then specifically defined in the appended claim.

Figure 1:
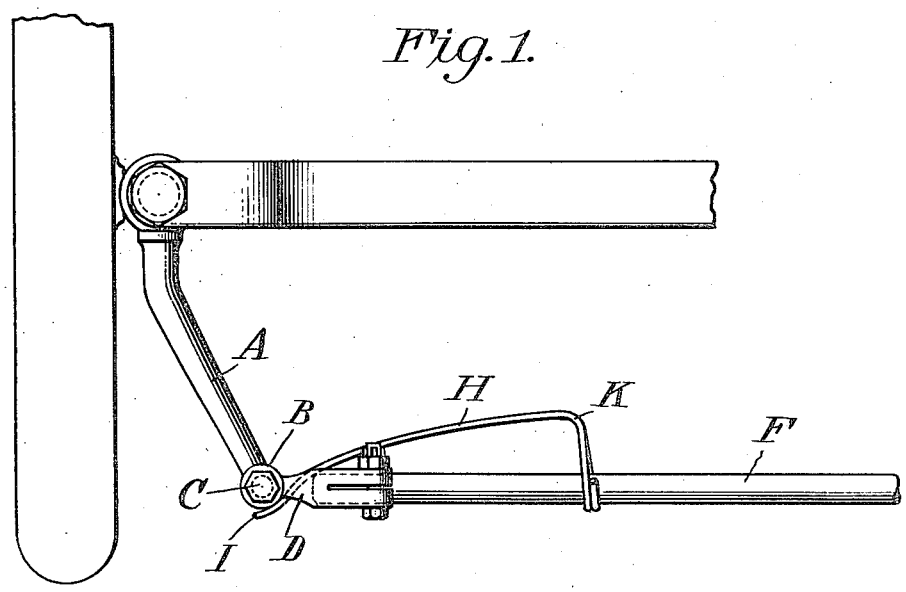
Figure 2:
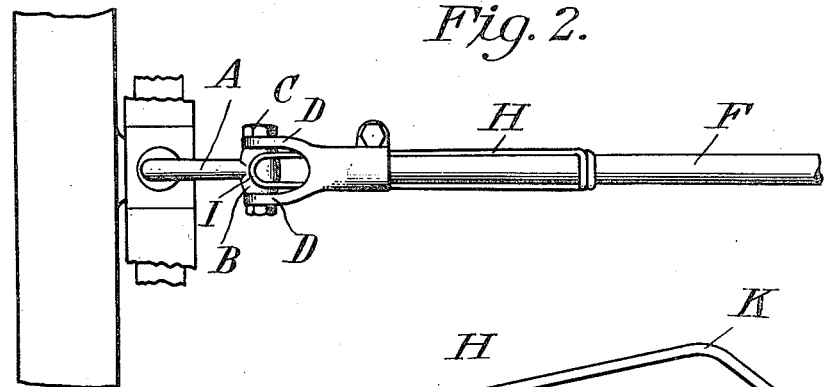
Figure 3:
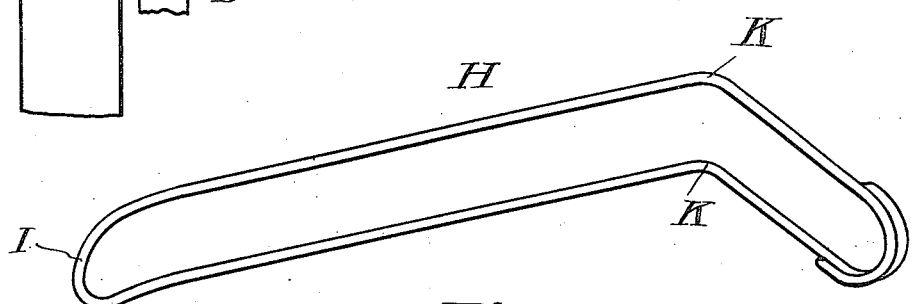

I illustrate my invention in the accompanying drawings, in which:

Figure 1 is a top plan view of the invention. Fig. 2 is an edge view, and Fig. 3 is a detail view of the silencing device removed.

Reference now being had to the details of the drawings by letter, A designates a spindle arm connected to the stub axle of the forward wheel of the vehicle and has a boss B at one end which is apertured for the reception of the pivotal bolt C, which latter passes through the arms D and the end of the steering rod F. A spring, designated by numeral H, is bent upon itself as at I and is passed through the space between the arms D and engages said boss, as shown in the drawings, the shank portions of the arm being bent at points designated by letter K at right angles and the ends of the wire bent to form curved hooks which engage over the steering rod F in different directions, the resiliency of the arms of said wire normally holding the ends in place and also the part which is bent upon itself against the boss upon the spindle arm, it being noted that the wire is fulcrumed against the marginal edges of the arms which carry the bolt C.

By the provision of a silencer or shock absorber embodying the features of my invention, it will be noted that the device may be easily and quickly applied to the steering bar and spindle of an automobile and will be effectual in holding the knuckle formed at the pivotal connection from rattling.

What I claim to be new is:—

In combination with a spindle arm of a stub axle, a steering rod having a forked end to which said spindle arm is pivoted, a wire bent upon itself at its longitudinal center and engaging at its bent portion the pivotal spindle end and extending between the forked part of the steering rod, said wire being fulcrumed over the edge of the forked portion and bent at right angles a short distance from its free ends, each end bent to form oppositely disposed hooks adapted to yieldingly engage the steering rod.

In testimony whereof I hereunto affix my signature in presence of two witnesses.

HOBART C. FLINT.

Witnesses:
H. C. LEE,
C. E. BOYNTON.